(12) United States Patent
Kwon (10) Patent No.: US 10,766,442 B2
(45) Date of Patent: Sep. 8, 2020

(54) SYSTEM AND METHOD FOR CONTROLLING POWER TO ELECTRONIC CONTROL UNIT OF VEHICLE

(71) Applicants: Hyundai Motor Company, Seoul (KR); Kia Motors Corporation, Seoul (KR)

(72) Inventor: Jae Min Kwon, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 51 days.

(21) Appl. No.: 16/201,745

(22) Filed: Nov. 27, 2018

(65) Prior Publication Data
US 2020/0062199 A1  Feb. 27, 2020

(30) Foreign Application Priority Data
Aug. 23, 2018 (KR) .......... 10-2018-0098591

(51) Int. Cl.
| | | |
|---|---|---|
| *B60R 16/03* | (2006.01) | |
| *B60R 16/023* | (2006.01) | |
| *H02H 3/04* | (2006.01) | |
| *H02J 9/06* | (2006.01) | |

(52) U.S. Cl.
CPC .......... *B60R 16/03* (2013.01); *B60R 16/0232* (2013.01); *H02H 3/046* (2013.01); *H02J 9/061* (2013.01)

(58) Field of Classification Search
CPC .... B60R 16/03; B60R 16/0232; H02H 3/046; H02J 9/061

USPC .................................. 307/10.1, 9.1, 64, 65
See application file for complete search history.

(56) References Cited

U.S. PATENT DOCUMENTS

| | | | |
|---|---|---|---|
| 6,738,701 B2 * | 5/2004 | Wilson .................. | F16H 59/044 307/10.1 |
| 2007/0222284 A1 | 9/2007 | Matsubara et al. | |
| 2012/0296567 A1 * | 11/2012 | Breed .................... | G01C 21/26 701/468 |
| 2018/0029474 A1 * | 2/2018 | Berels .................... | B60L 58/21 |

(Continued)

FOREIGN PATENT DOCUMENTS

| | | |
|---|---|---|
| JP | 2005-039899 A | 2/2005 |
| JP | 2011-041386 A | 2/2011 |

(Continued)

*Primary Examiner* — Michael R. Fin
(74) *Attorney, Agent, or Firm* — Mintz Levin Cohn Ferris Glovsky and Popeo, P.C.; Peter F. Corless (57) ABSTRACT

A power control system of an electronic control unit of a vehicle includes: a main power supply unit and an auxiliary power supply unit for supplying power to the electronic control unit; a main electronic fuse connected to a main circuit for detecting temperature or current flowing in the main circuit to determine whether a failure occurs in the main circuit; an auxiliary electronic fuse connected to an auxiliary circuit for detecting a temperature or current flowing in the auxiliary circuit to determine whether a failure occurs in the auxiliary circuit; and a power control unit connected to the main electronic fuse and to the auxiliary electronic fuse for controlling an ON/OFF operation of the main electronic fuse and the auxiliary electronic fuse according to whether a failure occurs in the main electronic fuse and the auxiliary electronic fuse.

12 Claims, 5 Drawing Sheets

(56) References Cited

U.S. PATENT DOCUMENTS

2018/0154906 A1\* 6/2018 Dudar ................. B60R 21/0136
2018/0259966 A1\* 9/2018 Long ........................ G08G 1/00

FOREIGN PATENT DOCUMENTS

| KR | 10-0536327 B1 | 12/2005 |
| KR | 10-2016-0096449 A | 8/2016 |
| KR | 10-2017-0004665 A | 1/2017 |
| KR | 10-2017-0032714 A | 3/2017 |

\* cited by examiner

SYSTEM AND METHOD FOR CONTROLLING POWER TO ELECTRONIC CONTROL UNIT OF VEHICLE

CROSS REFERENCE TO RELATED APPLICATION

The present application claims under 35 U.S.C. § 119(a) the benefit of Korean Patent Application No. 10-2018-0098591, filed Aug. 23, 2018, the entire contents of which are incorporated by reference herein.

BACKGROUND

1. Technical Field

The present disclosure relates to a system and method for supplying and controlling power to an electronic control unit of a vehicle, more particularly, to a power control system and method that may allow power to be supplied to the electronic control unit through an auxiliary power supply unit when a failure occurs in a main circuit that supplies power to the electronic control unit that controls a plurality of devices within an autonomous vehicle.

2. Description of the Related Art

An autonomous vehicle typically refers to a self-driving vehicle that recognizes a driving environment in order to determine a risk and plans a driving route without the need for direct operation by a driver, and may be composed of a sensing system, a central control device, an actuator, and the like.

Since autonomous vehicles are self-driving without operation on the part of a driver, regulations on safety-related systems are strict compared with those of non-autonomous vehicles, and research on safety-related systems is being actively conducted. Particularly, in the case of the autonomous vehicle, a plurality of devices including a suspension device, a braking device, and an acceleration device are electronically controlled through an electronic control unit without being operated by the driver, and therefore stable power supply to the electronic control unit is critical to operation thereof.

However, conventionally, a mechanical fuse is used as a circuit between a power supply unit and an electronic control unit for electronically controlling a plurality of devices, and therefore power is not supplied to the electronic control unit when the mechanical fuse is broken. In such an arrangement, the autonomous vehicle would be rendered inoperable, and thus unable to be driven normally. Accordingly, there is a need to develop a technology that enables autonomous running of a vehicle by supplying power stably even when a failure occurs in a circuit through which power is supplied to the electronic control unit for electronically controlling the plurality of devices in the vehicle.

SUMMARY

The present disclosure provides a system and method for supplying and controlling power (i.e., a power control system and method) to an electronic control unit of a vehicle, which may allow a power control unit to stably supply power to the electronic control unit through an auxiliary power supply unit when a failure occurs in a main circuit that supplies power to the electronic control unit.

In accordance with an aspect of the present disclosure, there is provided a power control system of an electronic control unit of a vehicle, the power control system including: the electronic control unit including a plurality of devices configured to enable autonomous running of the vehicle and a control module for controlling the plurality of devices; a main power supply unit and an auxiliary power supply unit configured to supply power to the electronic control unit; a main electronic fuse configured to be connected to a main circuit, which is connected to the main power supply unit and to the electronic control unit, and configured to detect at least one of a temperature and current flowing in the main circuit to determine whether a failure occurs in the main circuit; an auxiliary electronic fuse configured to be connected to an auxiliary circuit, which is connected to the auxiliary power supply unit and to the electronic control unit, and configured to detect at least one of a temperature and current flowing in the auxiliary circuit to determine whether a failure occurs in the auxiliary circuit; and a power control unit configured to be connected to the main electronic fuse and to the auxiliary electronic fuse, and configured to control an ON/OFF operation of the main electronic fuse and the auxiliary electronic fuse according to whether a failure occurs in the main electronic fuse and the auxiliary electronic fuse in order to control power to be supplied to the electronic control unit.

The main electronic fuse and the auxiliary electronic fuse may include at least one of a current-sensing unit configured to sense the current flowing in the circuit and a temperature-sensing unit configured to sense the temperature of the circuit, and a failure determination unit configured to determine information about occurrence/non-occurrence of the failure of the circuit by comparing the sensed current or temperature with a predetermined value.

The power control unit may turn off the main electronic fuse and turn on the auxiliary electronic fuse when it is determined by the main electronic fuse that the failure occurs in the main circuit, so that power is supplied to the electronic control unit through the auxiliary power supply unit.

The power control unit may control power to be selectively supplied to a plurality of electric loads in the vehicle through the auxiliary power supply unit when the failure occurs in the main circuit.

The power control unit may control the power to be selectively supplied to the plurality of electric loads in the vehicle according to a state of charge (SOC) of the auxiliary power supply unit when the power is selectively supplied to the plurality of electric loads in the vehicle through the auxiliary power supply unit.

The power control unit may turn on the main electronic fuse and turns off the auxiliary electronic fuse so that power is supplied to the electronic control unit through the main power supply unit when it is determined by the main electronic fuse that the main circuit is normal.

The power control system may further include: a display unit configured to display whether the failure occurs in the main electronic fuse or the auxiliary electronic fuse.

The power control unit may transmit information about a failure occurrence situation to an external vehicle failure service server when the failure occurs in the main electronic fuse or the auxiliary electronic fuse.

The power control system may further include: an autonomous running control unit configured to control the plurality of devices in the vehicle to control the vehicle to run autonomously.

The autonomous running control unit may control the vehicle to stop on a shoulder of a road when the failure occurs in the main circuit or the auxiliary circuit.

In accordance with another aspect of the present disclosure, there is provided a power control method of an electronic control unit of a vehicle, the power control method including: determining, by a main electronic fuse, whether a failure occurs in a main circuit by detecting at least one of a temperature and current flowing in the main circuit; and turning off, by a power control unit, the main electronic fuse and turning on an auxiliary electronic fuse when it is determined that the failure occurs in the main circuit so that power is supplied to the electronic control unit through an auxiliary power supply unit.

After the determining whether the failure occurs in the main circuit, the power control method may further include: displaying, by the power control unit, information about occurrence/non-occurrence of the failure on a display unit; and transmitting, by the power control unit, information about a failure occurrence situation to an external vehicle failure service server.

After the turning off and the turning on, the power control method may further include: controlling, by the power control unit, power to be selectively supplied to a plurality of electric loads in the vehicle through the auxiliary power supply unit.

After the turning off and the turning on, the power control method may further include: controlling, by an autonomous running control unit, the vehicle to stop on a shoulder of a road.

The controlling the vehicle to stop on the shoulder of the road may include: lighting, by the autonomous running control unit, an emergency light of the vehicle and reducing a speed, moving, by the autonomous running control unit, the vehicle to an outermost lane of the road; searching for, by the autonomous running control unit, a stopping space around the vehicle, and parking, by the autonomous running control unit, the vehicle in the stopping space.

According to the present disclosure, when the failure occurs in a main power supply unit and a main circuit of an electronic control unit so that power cannot be supplied from the main power supply unit to the electronic control unit, a power control unit may turn on an auxiliary electronic fuse to supply power to the electronic control unit through an auxiliary power supply unit, so that power can be stably supplied to the electronic control unit even when the failure occurs in the main circuit.

In addition, power may be stably supplied to the electronic control unit through the auxiliary power supply unit, so that autonomous running of the vehicle can be stably performed even when the failure occurs in the main circuit.

Further, when power cannot be supplied from the main power supply unit and the vehicle is running through power supplied through the auxiliary power supply unit, power may be supplied only to an electrical load associated with the running safety of the vehicle and power supply to other electric loads may be cut off, thereby enabling vehicle running while minimizing the power consumption of the auxiliary power supply unit.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a power control system and method for supplying and controlling power to an electronic control unit of a vehicle according to an embodiment of the present disclosure will be described with reference to the accompanying drawings.

Figure 1:
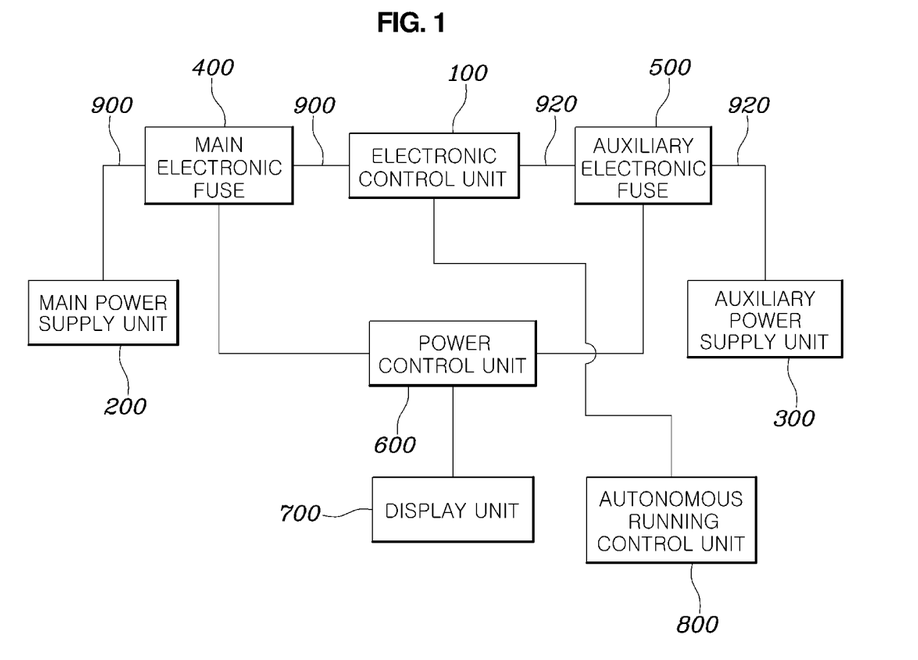
FIG. 1 is a block diagram illustrating the overall configuration of a power control system of an electronic control unit of a vehicle according to an embodiment of the present disclosure.
Figure 2:
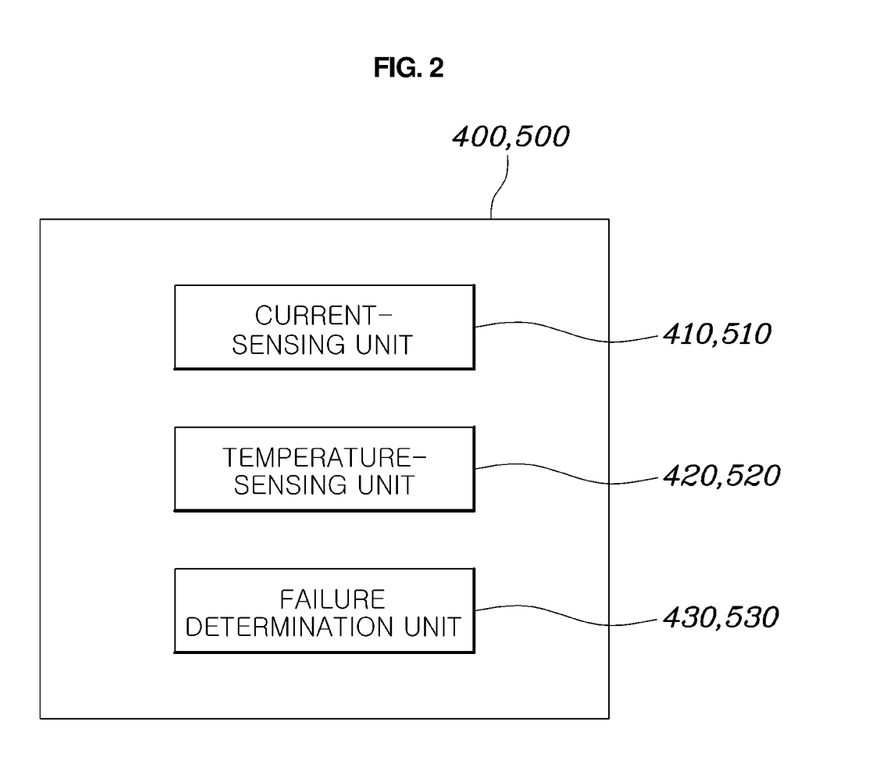
FIG. 2 is a block diagram illustrating the configuration of an electronic fuse in the power control system of FIG. 1.

FIG. 1 is a block diagram illustrating the overall configuration of the power control system according to an embodiment of the present disclosure, and FIG. 2 is a block diagram illustrating the configuration of an electronic fuse in the power control system of FIG. 1.

As shown in FIG. 1, the power control system of the electronic control unit according to an embodiment of the present disclosure may include an electronic control unit 100, a main power supply unit 200, an auxiliary power supply unit 300, a main electronic fuse 400, an auxiliary electronic fuse 500, and a power control unit 600, and may further include a display unit 700 and an autonomous running control unit 800 according to various embodiments of the present disclosure. Hereinafter, the configuration of the power control system according to an embodiment of the present disclosure will be described in detail.

The electronic control unit 100 may include a plurality of devices (not shown) for allowing autonomous running of the vehicle, and may include a control module (not shown) for controlling the plurality of devices. In other words, the vehicle in the present disclosure may be an autonomous vehicle. At this time, the plurality of devices in the vehicle may include motor-driven power steering (MDPS) associated with the steering for allowing autonomous running of the vehicle and an electronic stability control (ESC) associated with the braking of the vehicle, and may further include a traction control system (TCS), an anti-lock braking system (ABS), a limited-slip differential (LSD), and the like according to embodiments. In addition, the control module (not shown) of the electronic control unit 100 may serve to control the above-described plurality of devices in the vehicle to allow autonomous running of the vehicle.

The main power supply unit 200 and the auxiliary power supply unit 300 may be connected to the electronic control unit 100 through a circuit as shown in FIG. 1, and may supply power to the electronic control unit 100 so that the electronic control unit 100 may electronically control the plurality of devices in the vehicle. Specifically, the main power supply unit 200 and the auxiliary power supply unit 300 may supply power to the plurality of devices and the control module of the electronic control unit 100, so that the control module may control the plurality of devices in the vehicle to allow autonomous running of the vehicle. Here, according to embodiments, the main power supply unit 200 and the auxiliary power supply unit 300 may be batteries.

The main electronic fuse 400 may be connected to a main circuit 900 connected to the main power supply unit 200 and the electronic control unit 100, and may detect the temperature of and/or current flowing in the main circuit to determine whether a failure occurs in the main circuit. Specifically, the main electronic fuse 400 may include at least one of a current-sensing unit 410 for sensing the current flowing in the main circuit and a temperature-sensing unit 420 for sensing the temperature of the main circuit as shown in FIG. 2, and may include a failure determination unit 430 for determining whether a failure occurs in the main circuit by comparing the sensed current and/or temperature with a predetermined value. In other words, the main electronic fuse 400 may sense the current and/or temperature of the main circuit through the current-sensing unit 410 and/or the temperature-sensing unit 420, and may determine whether a failure occurs in the main circuit by comparing the sensed current and/or temperature with the predetermined value through the failure determination unit 430. At this time, when the current and/or temperature sensed by the failure determination unit 430 is larger than the predetermined value, it may be determined that a failure occurs in the main circuit. In addition, when it is determined by the failure determination unit 430 that a failure occurs in the main circuit, the main electronic fuse 400 may transmit information about the failure occurrence situation to the power control unit 600.

The auxiliary electronic fuse 500 may be connected to an auxiliary circuit 920, which in turn is connected to the auxiliary power supply unit 300 and the electronic control unit 100, and may detect the temperature of and/or current flowing in the auxiliary circuit in order to determine whether a failure occurs in the auxiliary circuit. Specifically, the auxiliary electronic fuse 500 may include at least one of a current-sensing unit 510 for sensing the current flowing in the auxiliary circuit and a temperature-sensing unit 520 for sensing the temperature of the auxiliary circuit as shown in FIG. 2, and may include a failure determination unit 530 for determining whether a failure occurs in the auxiliary circuit by comparing the sensed current and/or temperature with a predetermined value. In other words, the auxiliary electronic fuse 500 may sense the current and/or temperature of the auxiliary circuit through the current-sensing unit 510 and/or the temperature-sensing unit 520, and may determine whether a failure occurs in the auxiliary circuit by comparing the current and/or temperature sensed by the failure determination unit 530 with a predetermined value. At this time, when the current and/or temperature sensed by the failure determination unit 530 is larger than the predetermined value, it may be determined that a failure occurs in the auxiliary circuit. In addition, when it is determined by the failure determination unit 530 that a failure occurs in the auxiliary circuit, the auxiliary electronic fuse 500 may transmit information about the failure occurrence situation to the power control unit 600.

The power control unit 600 may be connected to the main electronic fuse 400 and to the auxiliary electronic fuse 500, and may control the ON/OFF operation of the main electronic fuse 400 and the auxiliary electronic fuse 500 according to whether a failure occurs in each of the main electronic fuse 400 and the auxiliary electronic fuse 500, thereby controlling the power supplied to the electronic control unit 100.

Specifically, when it is determined by the main electronic fuse 400 that a failure occurs in the main circuit and information about the corresponding failure situation is received from the main electronic fuse 400, the power control unit 600 may turn off the main electronic fuse 400 and turn on the auxiliary electronic fuse 500, so that power may be supplied to the electronic control unit 100 through the auxiliary power supply unit 300. In this manner, according to the present disclosure, when a failure occurs in the main circuit between the main power supply unit 200 and the electronic control unit 100 and power cannot be supplied from the main power supply unit 200 to the electronic control unit 100, the power control unit 600 may turn on the auxiliary electronic fuse 500 to supply power to the electronic control unit 100 through the auxiliary power supply unit 300, and therefore power may be stably supplied to the electronic control unit 100 even when a failure occurs in the main circuit. In addition, power may be stably supplied to the electronic control unit 100 through the auxiliary power supply unit 300, so that autonomous running of the vehicle can be performed stably even when a failure occurs in the main circuit.

Meanwhile, when a failure occurs in the main circuit, the power control unit 600 may control the power that is selectively supplied to a plurality of electric loads in the vehicle through the auxiliary power supply unit 300. Specifically, when power is selectively supplied to the plurality of electric loads in the vehicle through the auxiliary power supply unit 300, the power control unit 600 may allow power to be selectively supplied to the plurality of electric loads in the vehicle depending on the state of charge (SOC) of the auxiliary power supply unit 300.

More specifically, when power supply is required to be performed through the auxiliary power supply unit 300 in the state in which power supply from the main power supply unit 200 to the power control unit 100 is impossible due to the occurrence of a failure in the main circuit, the power control unit 600 may selectively supply the power only to the electric load associated with running safety and may cut off the power supply to the other electric loads in order to drive the vehicle while minimizing the power consumption of the auxiliary power supply unit 300. Here, the electric load associated with running safety of the vehicle may be an engine ECU, a transmission TCU, an MDPS, an ESC, a taillight/headlamp, a brake lamp, a fuel pump, etc., according to embodiments. On the other hand, electrical loads that are not directly associated with the running safety of the vehicle may be an air conditioner, a heater, indoor lamps, seat heating wires, steering wheel heating wires, a power trunk controller, etc.

In this manner, when the vehicle is running through the power supplied through the auxiliary power supply unit 300 because power cannot be supplied from the main power supply unit 200, the power control unit 600 may supply power only to the above-described electric load associated with the running safety of the vehicle and may cut off the power supply to the other electric loads, thereby enabling vehicle running while minimizing the power consumption of the auxiliary power supply unit 300.

Meanwhile, when it is determined by the main electronic fuse that the main circuit is normal, the power control unit 600 may turn on the main electronic fuse 400 and may turn off the auxiliary electronic fuse 500, thereby allowing power to be supplied to the electronic control unit 100 through the main power supply unit 200. Specifically, when the temperature and/or current sensed by the main electronic fuse 400 is equal to or less than a predetermined value after the occurrence of the failure in the main circuit, it may be determined that the main circuit is normal. At this time, the power control unit 600 may turn on the main electronic fuse 400 again and turn off the auxiliary electronic fuse 500, so that power may be supplied again to the electronic control unit 100 through the main power supply unit 200.

Further, when a failure occurs in the main electronic fuse 400 or the auxiliary electronic fuse 500, the power control unit 600 may transmit information about the failure occurrence to an external vehicle failure service server (not shown). In this way, when a failure occurs in the power system of the vehicle, the power control unit may transmit the current location of the vehicle, information about the failure situation thereof, etc., to the vehicle failure service server, so that corresponding failure service may be performed quickly.

Meanwhile, the power control system of the electronic control unit according to the present disclosure may further include a display unit 700 for displaying whether a failure occurs in the main electronic fuse 400 or the auxiliary electronic fuse 500. According to embodiments, the display unit 700 may be an audio/video/navigation (AVN) unit of the vehicle. In addition, the power control system of the electronic control unit according to the present disclosure may further include a speaker (not shown) for providing audible information about whether a failure occurs in the main electronic fuse 400 or the auxiliary electronic fuse 500. That is, whether a failure occurs in the main electronic fuse 400 or the auxiliary electronic fuse 500 may be visually displayed to a driver of the vehicle through the AVN or the like, and may be audibly provided to the driver of the vehicle through the speaker.

In addition, the power control system of the electronic control unit according to the present disclosure may further include an autonomous running control unit 800 for controlling the plurality of devices in the vehicle in order to control the autonomous running of the vehicle. The autonomous running control unit 800 may control the vehicle to stop at a shoulder of a road when a failure occurs in the main circuit or the auxiliary circuit. The process of controlling the vehicle to stop at the shoulder of the road through the autonomous running control unit 800 when a failure occurs in the main circuit or the auxiliary circuit will be described later in more detail with reference to FIG. 5.

Figure 3:
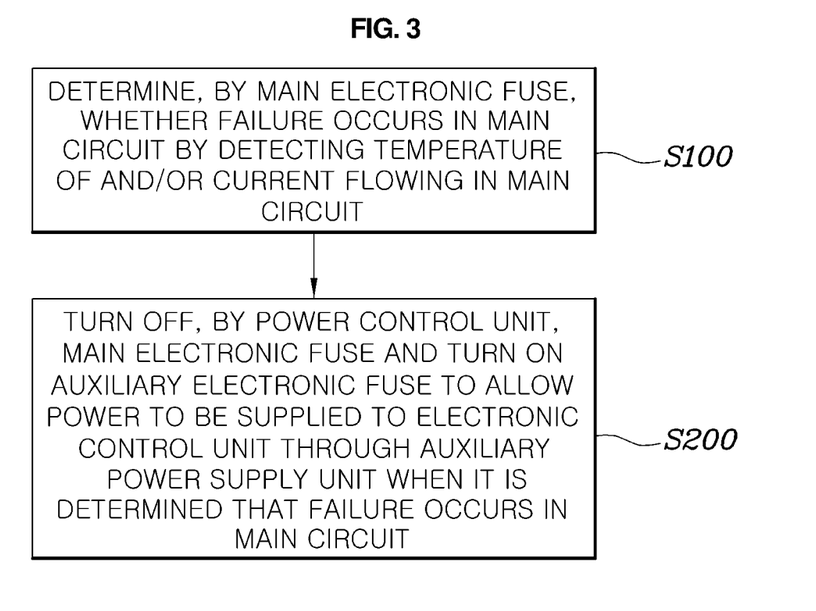
FIG. 3 is a flowchart illustrating a power control method of an electronic control unit of a vehicle according to an embodiment of the present disclosure.
Figure 4:
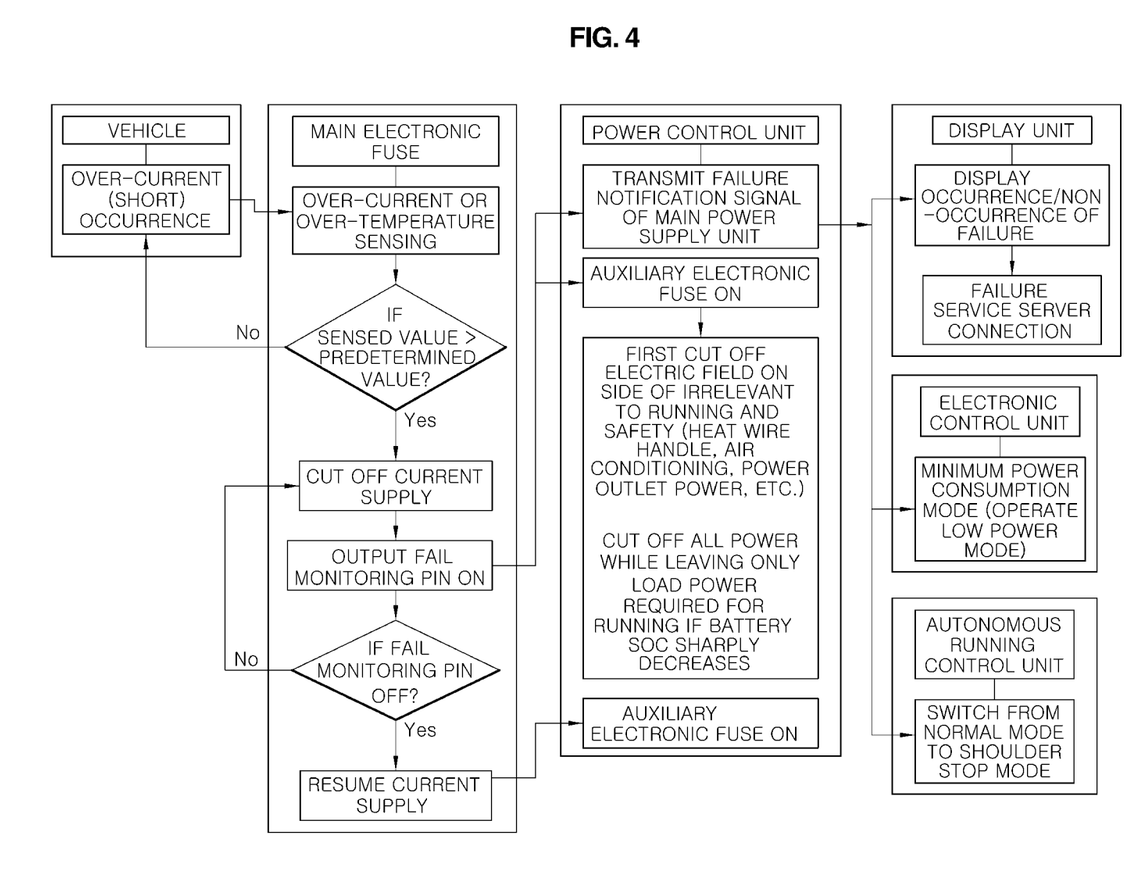
FIG. 4 is a block diagram illustrating a control flow of a detailed configuration in a power control method of an electronic control unit of a vehicle according to an embodiment of the present disclosure.
Figure 5:
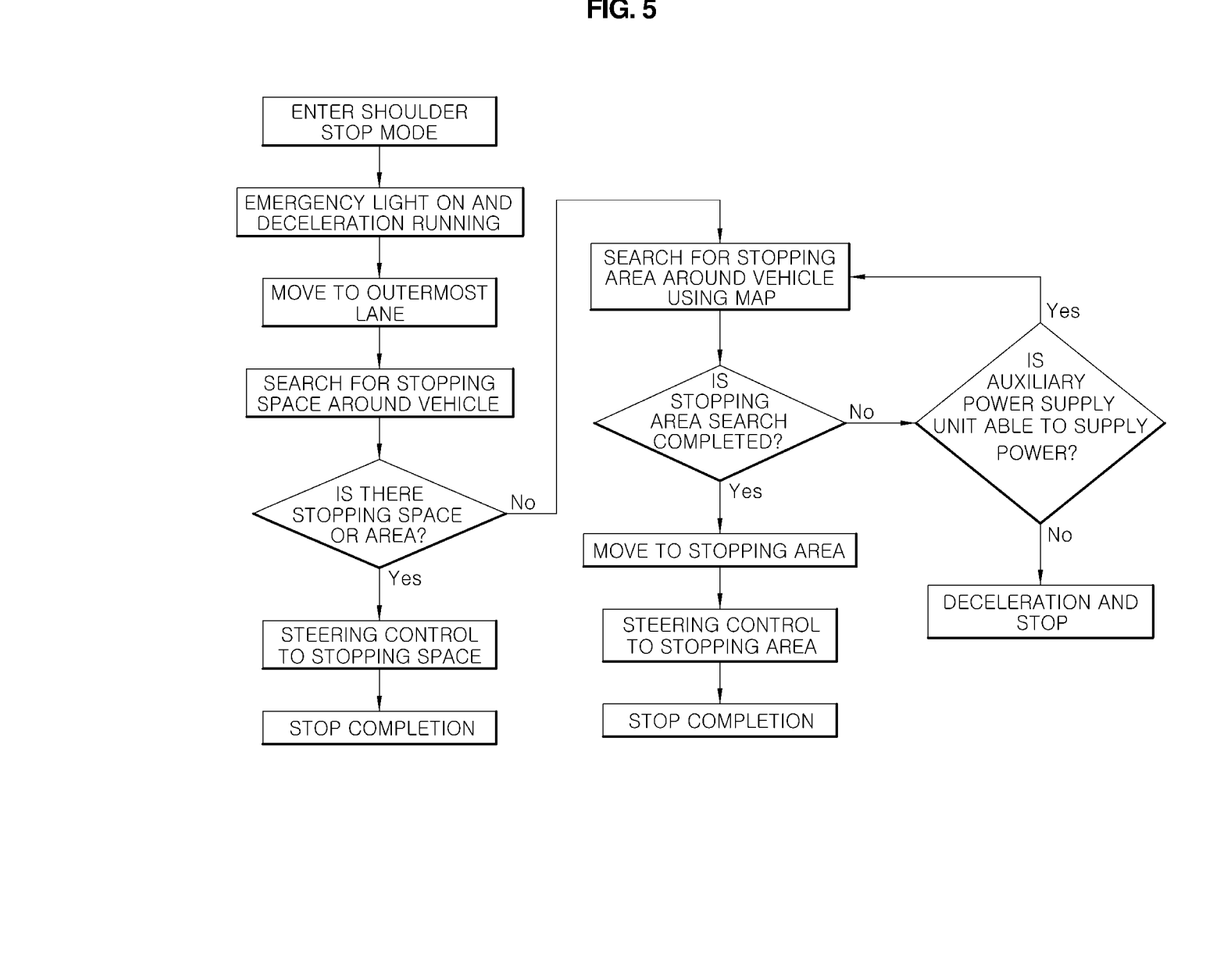
FIG. 5 is a block diagram illustrating a flow for controlling a vehicle to stop on a shoulder in a power control method of an electronic control unit of a vehicle according to an embodiment of the present disclosure.

Meanwhile, FIG. 3 is a flowchart illustrating a power control method of an electronic control unit of a vehicle according to an embodiment of the present disclosure, FIG. 4 is a block diagram illustrating a control flow of a detailed configuration in a power control method of an electronic control unit of a vehicle according to an embodiment of the present disclosure, and FIG. 5 is a block diagram illustrating a flow for controlling a vehicle to stop on a shoulder.

The power control method of the electronic control unit using the power control system may include determining, by the main electronic fuse, whether a failure occurs in the main circuit by detecting the temperature of and/or current flowing in the main circuit; and turning off, by the power control unit, the main electronic fuse and turning on the auxiliary electronic fuse when it is determined that the failure occurs in the main circuit so that power is supplied to the electronic control unit through the auxiliary power supply unit. Specifically, referring to FIG. 4, when the failure occurs in the main circuit and the temperature and/or current sensed by the main electronic fuse is larger than a predetermined value, the power control unit may turn off the main electronic fuse to cut off current supply from the main power supply unit, and may turn on the auxiliary electronic fuse to supply power to the electronic control unit through the auxiliary power supply unit. In addition, in FIG. 4, a FAIL monitoring PIN is a pin that is output when an error occurs in an electronic fuse. When it is determined that a failure occurs in the electronic fuse, the FAIL monitoring PIN may be output as ON, and when returning to a normal condition from a failure condition, the FAIL monitoring PIN may be output as OFF.

In addition, after the determining whether a failure occurs in the main circuit, the power control method may further include at least one of displaying, by the power control unit, the occurrence/non-occurrence of the failure on a display unit, and transmitting, by the power control unit, a failure occurrence situation to an external vehicle failure service server. In other words, when a failure occurs in the main circuit, the occurrence/non-occurrence of the failure of the main circuit may be displayed on the display unit, and the location and failure condition of the vehicle may be transmitted to the failure service server.

In addition, after the turning off the main electronic fuse and the turning on the auxiliary electronic fuse so that the power is supplied to the electronic control unit through the auxiliary power supply unit, the power control method may further include controlling, by the power control unit, power to be selectively supplied to a plurality of electric loads in the vehicle through the auxiliary power supply unit. At this time, the power control unit may selectively supply power only to the electric load associated with vehicle running safety through the auxiliary power supply unit, thereby enabling vehicle running while minimizing the power consumption of the auxiliary power supply unit.

Further, after the turning off the main electronic fuse and the turning on the auxiliary electronic fuse so that the power is supplied to the electronic control unit through the auxiliary power supply unit, the power control method may further include controlling, by the autonomous running control unit, the vehicle to stop on a shoulder of a road. Here, the controlling the vehicle to stop on the shoulder of the road may include lighting, by the autonomous running control unit, an emergency light of the vehicle and reducing a speed; moving, by the autonomous running control unit, the vehicle to the outermost lane of the road; searching for, by the autonomous running control unit, a stopping space around the vehicle; and parking, by the autonomous running control unit, the vehicle in the stopping space, as shown in FIG. 5.

In addition, when a stopping space around the vehicle is not found, the controlling the vehicle to stop on the shoulder of the road may further include searching for a stopping space around the vehicle using a map stored in a navigation in the vehicle in advance, and moving the vehicle to the found stopping space to stop the vehicle.

What is claimed is:

1. A power control system of an electronic control unit of a vehicle, the power control system comprising:
    the electronic control unit including a plurality of devices configured to enable autonomous running of the vehicle and a control module for controlling the plurality of devices;
    a main battery and an auxiliary battery configured to supply power to the electronic control unit;
    a main electronic fuse configured to be connected to a main circuit, which is connected to the main battery and the electronic control unit, and configured to detect at least one of a temperature and current flowing in the main circuit to determine whether a failure occurs in the main circuit;
    an auxiliary electronic fuse configured to be connected to an auxiliary circuit, which is connected to the auxiliary battery and to the electronic control unit, and configured to detect at least one of a temperature and current flowing in the auxiliary circuit to determine whether a failure occurs in the auxiliary circuit; and
    a power control unit configured to be connected to the main electronic fuse and to the auxiliary electronic fuse, and configured to control an ON/OFF operation of the main electronic fuse and the auxiliary electronic fuse according to whether a failure occurs in the main electronic fuse and the auxiliary electronic fuse in order to control power to be supplied to the electronic control unit,
    wherein the power control unit controls power to be selectively supplied to a plurality of electric loads in the vehicle through the auxiliary battery when the failure occurs in the main circuit,
    wherein the power control unit controls the power to he selectively supplied to the plurality of electric loads in the vehicle according to a state of charge (SOC) of the auxiliary battery when the power is selectively supplied to the plurality of electric loads in the vehicle through the auxiliary battery, and
    wherein the plurality of electric loads, to which the power is selectively supplied, include motor-driven power steering (MDPS) associated with the steering for allowing autonomous running of the vehicle and an electronic stability control (ESC) associated with the braking of the vehicle, and further includes a traction control system (TCS), an anti-lock braking system (ABS), and a limited-slip-differential (LSD).

2. The power control system of claim 1, wherein the main electronic fuse and the auxiliary electronic fuse include respectively:
    at least one of a current-sensing unit configured to sense the current flowing in the main circuit and the auxiliary circuit, and a temperature-sensing unit configured to sense the temperature of the main circuit and the auxiliary circuit, and
    a failure determination unit configured to determine information about occurrence/ non-occurrence of the failure of the main circuit and the auxiliary circuit by comparing the sensed current or temperature with a predetermined value.

3. The power control system of claim 1, wherein the power control unit turns off the main electronic fuse and turns on the auxiliary electronic fuse when it is determined by the main electronic fuse that the failure occurs in the main circuit, so that power is supplied to the electronic control unit through the auxiliary battery.

4. The power control system of claim 1, wherein the power control unit turns on the main electronic fuse and turns off the auxiliary electronic fuse so that power is supplied to the electronic control unit through the main battery when it is determined by the main electronic fuse that the main circuit is normal.

5. The power control system of claim 1, further comprising:
    a display unit configured to display whether the failure occurs in the main electronic fuse or the auxiliary electronic fuse.

6. The power control system of claim 1, wherein the power control unit transmits information about a failure occurrence situation to an external vehicle failure service server when the failure occurs in the main electronic fuse or the auxiliary electronic fuse.

7. The power control system of claim 1, further comprising:
    an autonomous running control unit configured to control the plurality of devices in the vehicle to control the vehicle to run autonomously.

8. The power control system of claim 7, wherein the autonomous running control unit controls the vehicle to stop on a shoulder of a road when the failure occurs in the main circuit or the auxiliary circuit.

9. A power control method of an electronic control unit of a vehicle, the power control method comprising:
    determining, by a main electronic fuse, whether a failure occurs in a main circuit by detecting at least one of a temperature and current flowing in the main circuit;
    turning off, by a power control unit, the main electronic fuse and turning on an auxiliary electronic fuse when it is determined that the failure occurs in the main circuit so that power is supplied to the electronic control unit through an auxiliary battery; and controlling, by the power control unit, power to be selectively supplied to a plurality of electric loads in the vehicle through the auxiliary battery, wherein the plurality of electric loads, to which the power is selectively supplied, include motor-driven power steering (MDPS) associated with the steering for allowing autonomous running of the vehicle and an electronic stability control (ESC) associated with the braking of the vehicle, and further includes a traction control system (TCS), and anti-locking braking system (ABS), and a limited-slip-differential (LSD).

10. The power control method of claim 9, further comprising, after determining whether the failure occurs in the main circuit:

displaying, by the power control unit, information about occurrence/non-occurrence of the failure on a display unit; and transmitting, by the power control unit, information about a failure occurrence situation to an external vehicle failure service server.

11. The power control method of claim 10, further comprising, after the turning off and the turning on:

controlling, by an autonomous running control unit, the vehicle to stop.

12. The power control method of claim 11, wherein controlling the vehicle to stop comprises:

lighting, by the autonomous running control unit, an emergency light of the vehicle and reducing a speed, moving, by the autonomous running control unit, the vehicle to an outermost lane of the road;

searching for, by the autonomous running control unit, a stopping space around the vehicle, and parking, by the autonomous running control unit, the vehicle in the stopping space.

* * * * *